US010488506B2

(12) United States Patent
Takehara et al.

(10) Patent No.: US 10,488,506 B2
(45) Date of Patent: Nov. 26, 2019

(54) MOVING BODY RECOGNITION SYSTEM

(71) Applicant: Mitsubishi Electric Corporation, Tokyo (JP)

(72) Inventors: Takayoshi Takehara, Tokyo (JP); Takeshi Nishiwaki, Tokyo (JP); Takashi Maeda, Tokyo (JP); Keisuke Morita, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 467 days.

(21) Appl. No.: 15/207,564

(22) Filed: Jul. 12, 2016

(65) Prior Publication Data
US 2017/0276780 A1  Sep. 28, 2017

(30) Foreign Application Priority Data

Mar. 22, 2016  (JP) ................................. 2016-056558

(51) Int. Cl.
| | |
|---|---|
| *G01S 13/56* | (2006.01) |
| *G08G 1/16* | (2006.01) |
| *G01S 7/00* | (2006.01) |
| *G01S 7/41* | (2006.01) |
| *G01S 13/93* | (2006.01) |
| *B60R 1/08* | (2006.01) |

(52) U.S. Cl.
CPC .............. *G01S 13/56* (2013.01); *G01S 7/006* (2013.01); *G01S 7/411* (2013.01); *G08G 1/167* (2013.01); *B60R 1/081* (2013.01); *G01S 13/931* (2013.01); *G01S 2013/9332* (2013.01); *G01S 2013/9385* (2013.01)

(58) Field of Classification Search
CPC ........... G01S 2013/9332; G01S 13/931; G01S 2013/9353; G01S 2013/9385; G01S 2013/936; G01S 2013/9367; G01S 13/87; G01S 2013/9317; G08G 1/167; G08G 1/164; G08G 1/096716; G08G 1/096741; G08G 1/096791; G08G 1/161; G08G 1/165; G08G 1/166; B62D 15/029; B60Q 9/008; B60Q 9/006; B60R 11/04; B60R 2300/301
See application file for complete search history.

(56) References Cited

U.S. PATENT DOCUMENTS 5,521,579 A * 5/1996 Bernhard ........... B60K 31/0008
                                           180/167
2006/0284760 A1* 12/2006 Natsume ............. B60R 21/0134
                                           342/70
2009/0237293 A1    9/2009 Sakuma
                      (Continued)

FOREIGN PATENT DOCUMENTS

JP           4569652 B2    10/2010

*Primary Examiner* — Olumide Ajibade Akonai
(74) *Attorney, Agent, or Firm* — Sughrue Mion, PLLC; Richard C. Turner

(57) ABSTRACT

Using communication unit positional information acquired using infrastructure communication and moving body positional information detected using millimeter-wave radar, a moving body existing in a blind spot of a radar detection region is recognized, and behavior is predicted from movement information of the moving body, by deleting the moving body information detected by millimeter-wave radar from the communication unit information acquired using infrastructure communication.

11 Claims, 6 Drawing Sheets

(56) References Cited

U.S. PATENT DOCUMENTS

| | | | | |
|---|---|---|---|---|
| 2010/0099353 A1* | 4/2010 | Komori | ............ | G08G 1/096716 |
| | | | | 455/39 |
| 2013/0223686 A1* | 8/2013 | Shimizu | ................. | G08G 1/166 |
| | | | | 382/103 |
| 2014/0062724 A1* | 3/2014 | Varoglu | ................. | G08G 1/163 |
| | | | | 340/902 |
| 2014/0333467 A1* | 11/2014 | Inomata | ................ | G01S 13/867 |
| | | | | 342/27 |
| 2015/0077236 A1* | 3/2015 | Le Masurier | ......... | G08G 1/087 |
| | | | | 340/435 |
| 2016/0023598 A1* | 1/2016 | Kohler | ................. | G01S 13/931 |
| | | | | 340/435 |
| 2016/0252610 A1* | 9/2016 | Smith | ................... | G01S 13/931 |
| | | | | 342/27 |

* cited by examiner

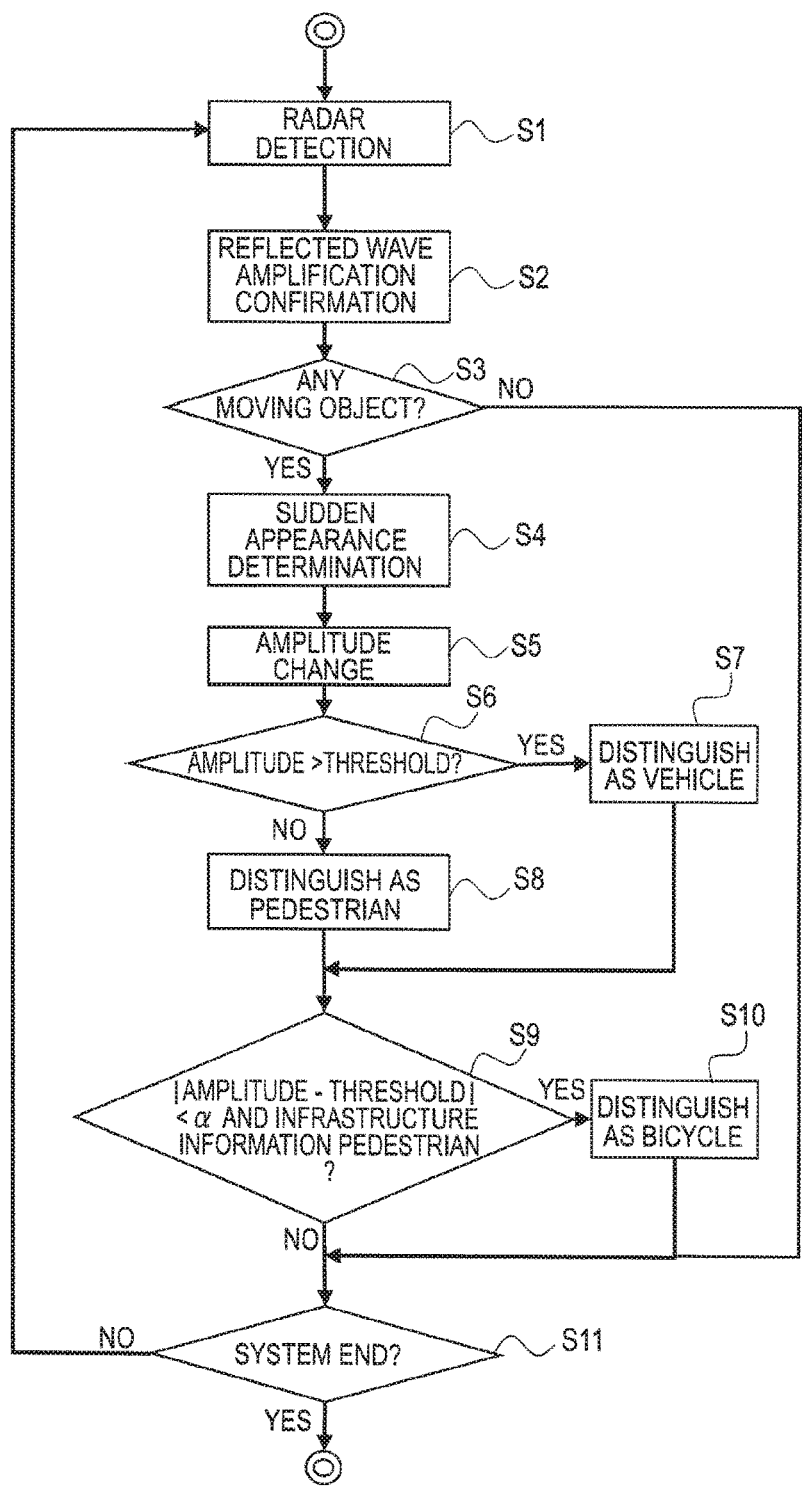

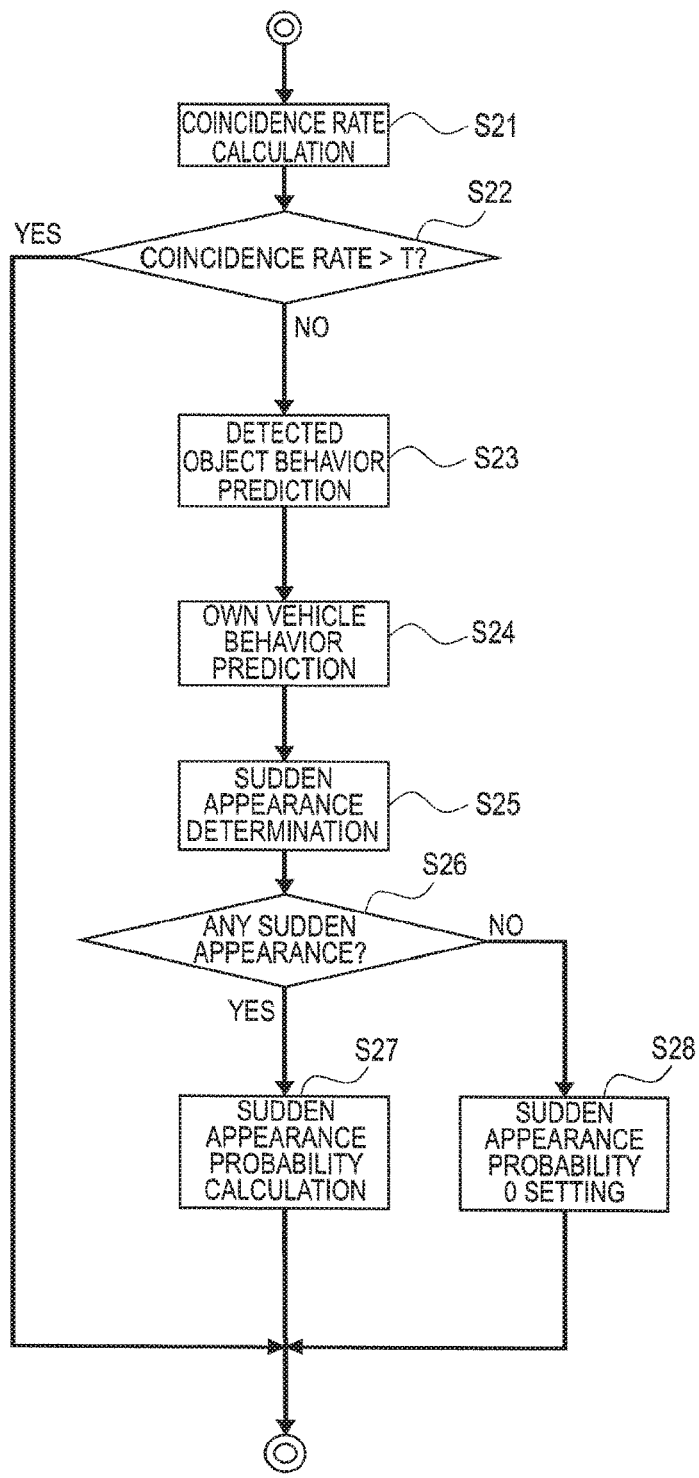

MOVING BODY RECOGNITION SYSTEM

BACKGROUND OF THE INVENTION

Field of the Invention

The present invention relates to a moving body recognition system that recognizes a moving body such as a vehicle or pedestrian.

Description of the Related Art

With automatic driving of a vehicle or preventive safety technology as an object, acquisition of information for avoiding collision with a vehicle or pedestrian is carried out utilizing acquisition of visual information using a camera or the like, detection of a moving body using a sensor such as infrared radar or millimeter-wave radar, or a communication network (hereafter referred to as infrastructure communication), such as a device that communicates between vehicles (hereafter referred to as inter-vehicle) or a communication device installed on a roadside or the like (a roadside unit) and a vehicle communication device (hereafter referred to as road-to-vehicle).

For example, detection of a moving body using millimeter-wave radar is such that distinguishing of the position and category of a moving body is carried out by the millimeter-wave radar being directed in a predetermined direction and transmitted, and reflected waves from a moving body existing in that direction being detected, measured, and analyzed. The position of the moving body is detected by the delay time between transmitted millimeter waves and received millimeter waves, or the like, while the category of the moving body is distinguished by distinguishing the strength of electric waves reflected from the moving body. When attenuation of the reflected electric waves is small in comparison with the transmitted electric waves, the moving body is seen to be a strongly reflecting moving body and thus determined to be a vehicle, while when the reflected electric waves are weak electric waves, the moving body is determined to be a human body.

Also, infrastructure communication such as inter-vehicle or road-to-vehicle is such that acquisition of information on the position, velocity, and the like, of another vehicle, a pedestrian, or the like, is carried out in accordance with electric waves output from a roadside unit, another vehicle, or a portable terminal possessed by a pedestrian or the like, using dedicated short range communications (DSRC) or the like.

Furthermore, as positional information of a communication device mounted in a vehicle is information obtained from a global positioning system (GPS), the information includes a slight error, and the error is of a size that cannot be ignored with respect to the size of the vehicle, because of which there is technology whereby the existence of a vehicle with which there is a danger of collision is more accurately recognized by positional information of another vehicle being recognized by the communication device mounted in the vehicle, and the positional information being corrected by information obtained by radar, as disclosed in Patent Document 1.

Patent Document 1: Japanese Patent No. 4,569,652

As disclosed in Patent Document 1, being able to more accurately recognize the existence of a vehicle with which there is a danger of collision by an error included in positional information of a vehicle acquired by infrastructure communication, with positional information of a peripheral vehicle traveling in the same direction on a road with multiple lanes as a target, being corrected by information obtained by radar, and a change in the position of the peripheral vehicle with respect to the vehicle itself being estimated, is important in accurately ascertaining the positional relationship of the peripheral vehicle to the vehicle itself.

However, information on a peripheral vehicle alone is not sufficient with respect to a sudden appearance of a vehicle, pedestrian, or the like, from a region forming a radar blind spot at a multiple of intersections and the like existing in a road, and further improvement is needed as a way of avoiding collision.

SUMMARY OF THE INVENTION

The invention has an object of providing a moving body recognition system for detecting a sudden appearance in a road of a vehicle, pedestrian, or the like.

A moving body recognition system of the invention includes a moving body position detection unit that receives millimeter-wave radar waves reflected from a moving body and detects radar detected positional information of the moving body in a radar detection region, a communication unit position detection unit that, using a signal from a communication unit possessed by the moving body, detects positional information of the communication unit, and a moving body recognition unit that recognizes a moving body positioned in a blind spot of the detection region by deleting information of the communication unit having positional information near the moving body radar detected positional information detected by the moving body position detection unit from information of the communication unit detected by the communication unit position detection unit.

According to the moving body recognition system of the invention, a moving body not detected by the moving body position detection unit is singled out from among moving bodies detected by the communication unit position detection unit, and movement, that is, a sudden appearance, of a moving body positioned in a region forming a millimeter-wave radar blind spot can be predicted by carrying out a prediction of the track of the moving body.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart showing a process procedure for distinguishing a moving body using radar in the recognition system;

FIG. 8 is a flowchart showing a specific process procedure for determining sudden appearance in step S4 of FIG.

DETAILED DESCRIPTION OF THE INVENTION

First Embodiment
Moving Body Recognition System Operation Example

Figure 1:
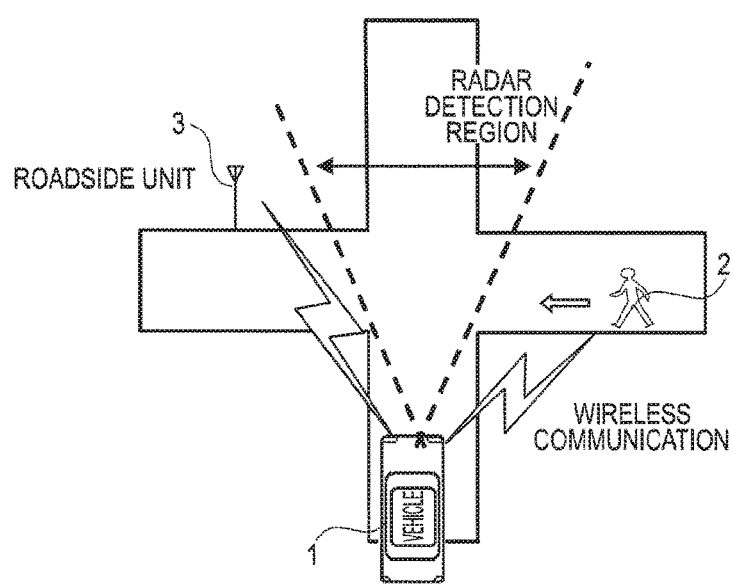
FIG. 1 is a diagram showing an operational aspect of a moving body recognition system of a first embodiment of the invention.

FIG. 1 shows a moving body recognition system operation example. FIG. 1 shows a vehicle 1 about to enter an intersection and a pedestrian 2 approaching the intersection. In this situation, due to an obstacle such as a building, the pedestrian 2 cannot be seen from the vehicle 1 until the pedestrian 2 enters the intersection. Also, due to an obstacle such as a building, the pedestrian 2 is in a blind spot of a detection region of millimeter-wave radar included in the vehicle 1 until the pedestrian 2 enters the intersection. A moving body recognition system including a millimeter-wave radar detection function and an infrastructure communication function is included in the vehicle 1, the pedestrian 2 possesses a portable terminal including an infrastructure communication function, and a roadside unit 3 including an infrastructure communication function is provided at the intersection.

In addition to moving body detection by millimeter-wave radar, the moving body recognition system included in the vehicle 1 carries out acquisition of a position and information of the pedestrian 2 from the portable terminal held by the pedestrian 2 using infrastructure communication, and acquisition of information on traffic light status, road signs, and past accident occurrence of peripheral roads from the roadside unit 3. Also, the moving body recognition system is configured so as to carry out a distinguishing of the type of moving body and a sudden appearance prediction at the same time as detecting a moving body.

Moving Body Recognition System Configuration

Figure 2:
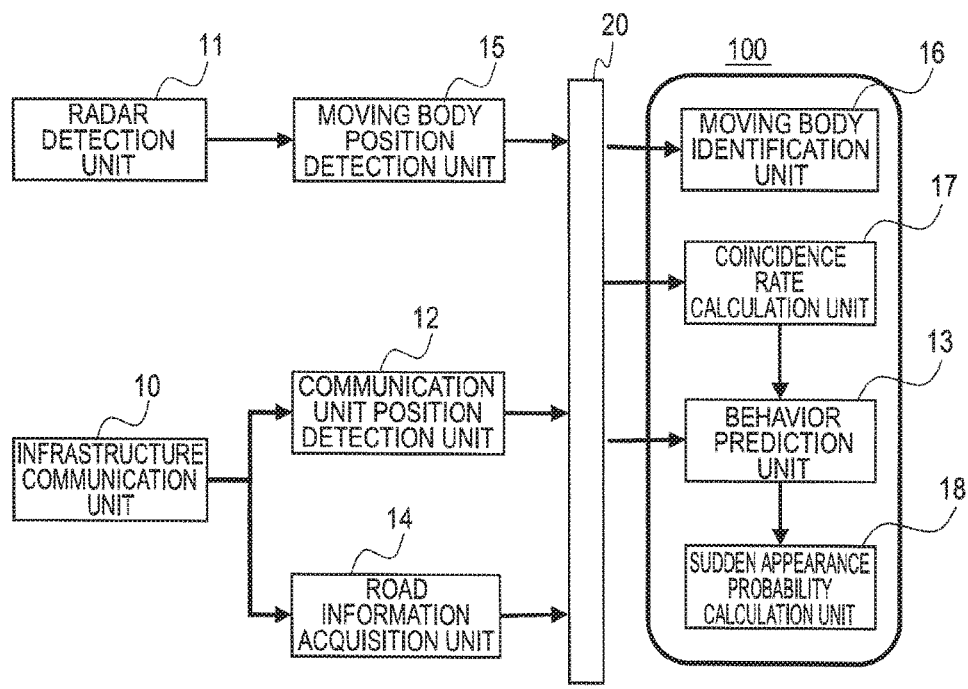
FIG. 2 is a block diagram showing a configuration of the moving body recognition system of the first embodiment of the invention.

The moving body recognition system mounted in the vehicle 1 of FIG. 1 is configured as shown in FIG. 2. That is, the moving body recognition system includes an infrastructure communication unit 10 and a radar detection unit 11.

The infrastructure communication unit 10 is connected to a controller area network (CAN) through which vehicle information flows, receives a signal from an infrastructure communication unit included in another vehicle, a portable terminal possessed by a pedestrian, or a roadside unit installed on a road side, overhead line, or the like, and detects the position of a communication unit such as an infrastructure communication unit of another vehicle, a portable terminal of a pedestrian, or a roadside unit using a communication unit position detection unit 12. Also, the infrastructure communication unit 10 is connected to a road information acquisition unit 14, and is configured so as to acquire road information provided by a roadside unit.

Also, the radar detection unit 11 receives reflections of millimeter waves transmitted from an antenna (not shown). Information from the radar detection unit 11 is sent to a moving body position detection unit 15, and the position of a moving body is detected by transmitted millimeter waves and received reflected waves being compared and processed in the moving body position detection unit 15.

The moving body position detection unit 15, communication unit position detection unit 12, and road information acquisition unit 14 are connected to a communication bus 20, and the configuration is such that information output by the moving body position detection unit 15, communication unit position detection unit 12, and road information acquisition unit 14 is utilized in determining whether or not a moving body has a bearing on the travel of the vehicle itself.

The moving body position detection unit 15 distinguishes between a stationary object and a moving body from a temporal change in reflected millimeter waves, detects the position of a moving body, and outputs moving body radar detected positional information. That is, the moving body position detection unit 15 divides reflected waves into reflected waves that change together with time and reflected waves that do not change, treats reflected waves that do not change as background information, and treats reflected waves that change as reflected waves from a moving body. Also, the moving body position detection unit 15 detects not only the position of a moving object, but also detects information on the amplitude of reflected waves.

The communication unit position detection unit 12 detects positional information of communication units existing in all directions in the vehicle periphery. That is, using wireless communication, the communication unit position detection unit 12 detects positional information of a communication unit mounted in a peripheral vehicle and a communication unit possessed by the pedestrian 2 from infrastructure, including from a region in a millimeter-wave radar blind spot such as behind a building, and the like, and outputs the communication unit positional information. Positional information of a communication unit mounted in a vehicle or a communication unit possessed by a pedestrian can be acquired by wireless communication with the communication unit. Also, the infrastructure communication unit 10 can acquire communication unit positional information via the roadside unit 3.

A moving body recognition unit 100 is connected to the communication bus 20. The moving body recognition unit 100 is configured to include a moving body identification unit 16, a coincidence rate calculation unit 17, a behavior prediction unit 13, and a sudden appearance probability calculation unit 18.

The coincidence rate calculation unit 17 receives communication unit positional information obtained using infrastructure communication from the communication unit position detection unit 12, and moving body radar detected positional information obtained using millimeter-wave radar from the moving body position detection unit 15, and calculates the coincidence rate of the moving body radar detected positional information and communication unit positional information.

Generally, moving body radar detected positional information and communication unit positional information are slightly non-coinciding. Because of this, an error range is set as a threshold, and distinguishing between coinciding and differing communication unit positional information and moving body radar detected positional information is carried out from positional information and movement information. Further, a communication unit with positional information such that there is communication unit positional information obtained using infrastructure communication, but movement body radar detected positional information cannot be obtained, is extracted as a target for action.

Figure 3:
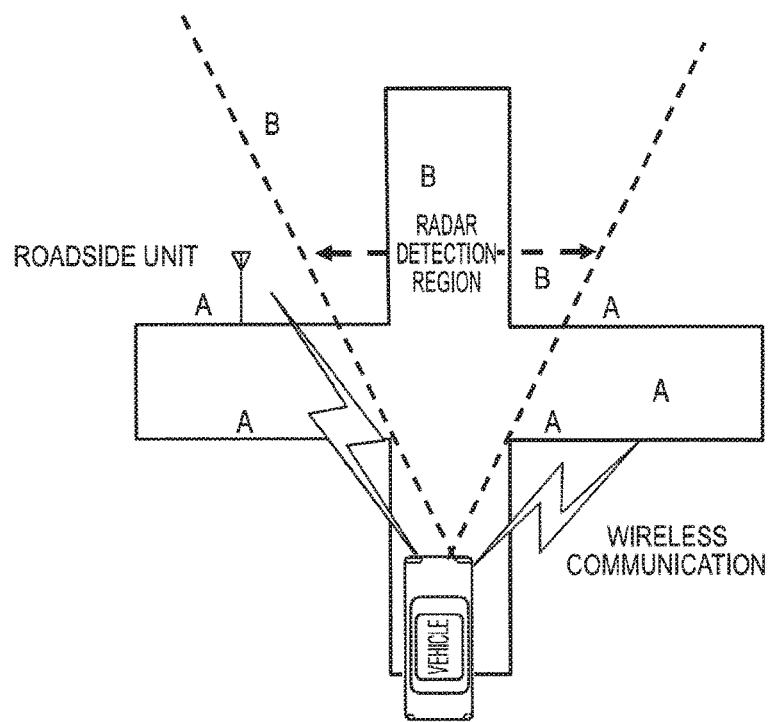
FIG. 3 is a diagram showing a state wherein communication units are detected by the moving body recognition system of the first embodiment of the invention.

Positional information of the communication unit position detection unit 12 is such that communication units are in two states, as indicated by A and B in FIG. 3. A communication unit position indicated by A in FIG. 3 is in a radar detection region blind spot, while the position of a communication unit indicated by B in FIG. 3 indicates the position of a communication unit that is in a radar detection region.

However, this cannot be distinguished simply from positional information of the communication unit position detection unit 12. Because of this, the coincidence rate of the moving body radar detected positional information and communication unit positional information is calculated, whereby positional information of a communication unit A positioned in a radar detection region blind spot can be ascertained. The communication unit A positioned in a radar detection region blind spot obtained here is treated as a monitoring target.

Figure 4:
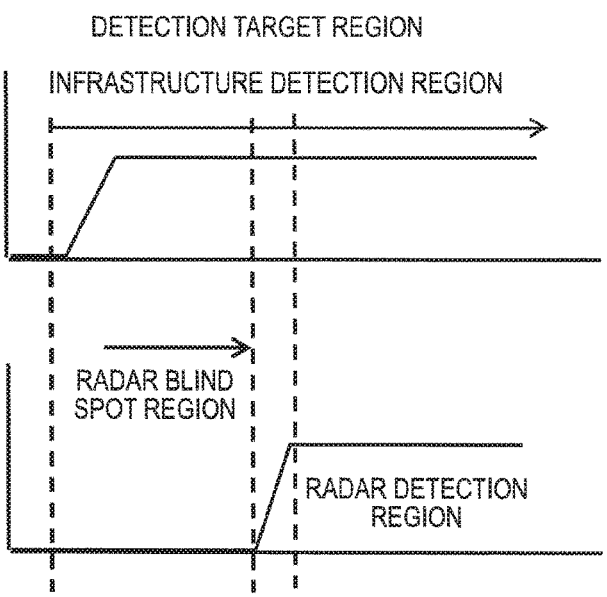
FIG. 4 is a diagram showing a state of traffic lights detected by the moving body recognition system of the first embodiment of the invention.

Some of the communication units shown as A in FIG. 3 appear directly in front of the vehicle itself, entering the radar detection region. A detection state of a communication unit positioned in a blind spot of the radar detection region is as shown in FIG. 4. That is, an upper level of FIG. 4 represents a state of detecting communication unit positional information obtained using infrastructure communication, while a lower level represents a state of detecting moving body radar detected positional information obtained using millimeter-wave radar, and the elapse of time is represented on the horizontal axis.

That is, when the vehicle itself approaches a communication unit positioned in a blind spot of the radar detection region and enters a region in which communication unit positional information obtained using infrastructure communication is detected, a detection value starts up.

As opposed to this, a moving body that is a target is in a blind spot of the detection region when using millimeter-wave radar, because of which the detection value does not start up, and the moving body is treated as not being a problem. Then, the moving body appears in front of the eyes from the blind spot, the detection value suddenly starts up, and a sudden response to the sudden appearance of a problematic moving body is required.

Herein, when all communication unit positional information obtained using infrastructure communication is taken as a target, the amount of information is large, and time is needed to process the information. In this embodiment, a moving body positioned in a blind spot is singled out, and a sudden appearance prediction is carried with only this moving body as a target, whereby the amount of information processing is reduced as far as possible, and the response can be quickened.

Figure 5:
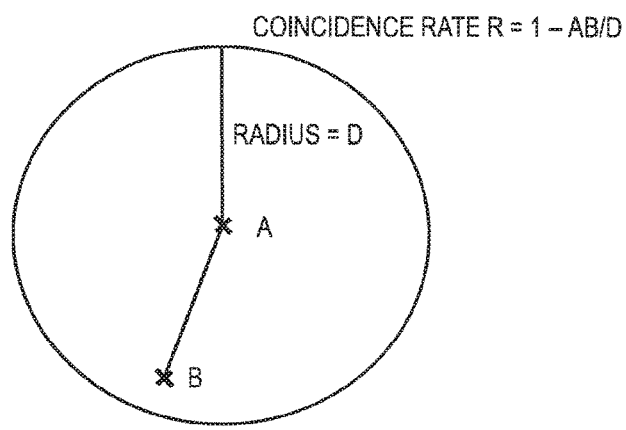
FIG. 5 is a schematic view representing a relationship between variables relating to a degree of coincidence.

The coincidence rate of the moving body radar detected positional information and communication unit positional information is calculated using the numerals shown in FIG. 5. Taking an infrastructure communication prediction region to be a circle with central coordinates A (x0, y0) and radius D, and positional coordinates detected by radar to be B (x1, y1), a value obtained by the value of a distance of a line segment AB divided by the radius D being subtracted from 1 is defined as a coincidence rate (R).

Therefore, the coincidence rate is calculated as below.

Coincidence rate: $R=1-(AB/D)$

A: central coordinates of infrastructure communication prediction region
B: radar detection position
D: infrastructure communication prediction radius The moving body identification unit 16 can distinguish between vehicle and pedestrian categories by acquiring reflected wave amplitude information obtained using millimeter-wave radar output from the moving body position detection unit 15, acquiring the coincidence rate from the coincidence rate calculation unit 17, and changing a moving body identification amplitude threshold.

In the event that a moving body category when using infrastructure communication is a mobile telephone or the like possessed by a pedestrian, the threshold is changed as below.

$th1=th0\times(1+R)$ th1: threshold after change
th0: threshold before change
R: coincidence rate Meanwhile, when a moving body category when using infrastructure communication is a communication unit mounted in a vehicle, the threshold is changed as below.

$th1=th0\times(1-R)$

The behavior prediction unit 13 acquires the velocity of the vehicle itself from the CAN or the like of the vehicle itself, acquires positional information of an object detected outside the millimeter-wave radar detection region, that is, a communication unit positioned in a millimeter-wave radar blind spot, from the communication unit position detection unit 12, predicts the next movement destination from past positional information, and represents the movement destination using a prediction vector.

Taking an $i^{th}$ past velocity vector to be $X_i$, an $i^{th}$ weighting constant to be $A_i$, and a constant indicating up to which item of data is to be used to be N, a first prediction vector Y, which is a latest position, is defined as below.

$$Y=1/N\Sigma_1^N(A_i\times X_i) \qquad \text{Math. 1}$$

Note that (N≥1)

The parameter $A_i$ can be set at an optional value.

Herein, by the latest weighting constant $A_i$ being greater than a past weighting constant, calculation is carried out so that the effect of the latest prediction vector is large, and the sudden appearance probability can be raised swiftly even in response to sudden behavior of another vehicle or a pedestrian.

Figure 6:
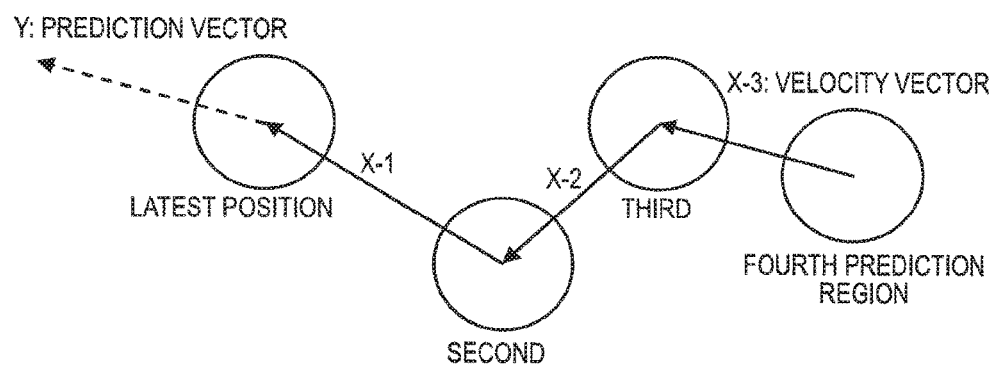
FIG. 6 is a schematic view of a prediction vector.

An example of a prediction vector of a moving body acquired using infrastructure communication is shown in FIG. 6. The prediction vector Y is such that each of velocity vectors X1, X2, and X3 until reaching the latest position is weighted and added, and the average thereof calculated, because of which the next behavior can be expressed as a vector from the latest position.

The road information acquisition unit 14 acquires information on the existence of peripheral traffic lights or road signs, and information on whether or not past accidents have occurred, and the like, using wireless communication from infrastructure such as the roadside unit 3 installed in the vicinity of a road, such as at an intersection.

Moving Body Distinguishing Process Procedure

FIG. 7 shows a flowchart of a moving body distinguishing process. The flowchart of FIG. 7 represents a processing of moving body radar detected positional information obtained using millimeter-wave radar. Step S1 indicates that the radar detection unit 11 emits millimeter-wave radar, and that the moving body position detection unit 15 calculates the position of a moving body in accordance with returning reflected radar waves reflected from the moving body. Step S2 indicates that the moving body position detection unit 15 carries out an increase of the amplitude of the reflected radar waves.

The moving body identification unit 16 determines whether or not a moving body that is a vehicle or pedestrian exists in step S3, confirms whether the millimeter-wave radar system including the radar detection unit 11 is to end in step S11 if no moving body is detected, and carries out radar detection in step S1 again if the system is not to end. Meanwhile, if the system is to end, the moving body identification unit 16 ends the process.

If a moving body is detected in step S3, the process of the millimeter-wave radar system including the radar detection unit 11 proceeds to step S4.

In step S4, a sudden appearance determination process is carried out. Details are shown in FIG. 8.

Figure 10:
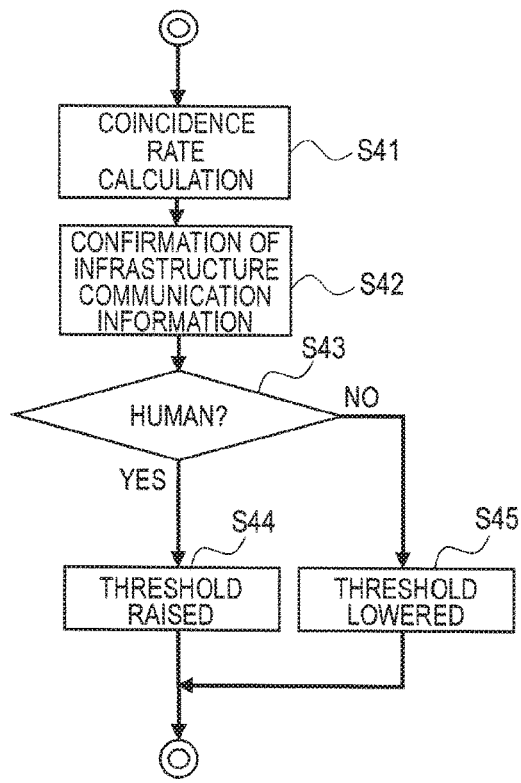
FIG. 10 is a flowchart showing a specific process procedure for changing a threshold in step S5 of FIG. 7.

In step S5, an amplitude change process is carried out. Details are shown in FIG. 10.

Continuing, the amplitude of the reflected waves and a threshold are compared in step S6, and if the amplitude of the reflected waves is greater than the threshold, the moving body identification unit 16 distinguishes the category of the moving body as a vehicle in step S7. Meanwhile, if the amplitude of the reflected waves is smaller than the threshold, the moving body identification unit 16 distinguishes the category as a pedestrian in step S8. Reflection from a pedestrian is considered to be reflection from a large number of points, and the distinguishing can be carried out by ascertaining reflection characteristics in advance.

Continuing, steps from step S9 onward describe a process of distinguishing a bicycle.

Sudden Appearance Determination Process Procedure

As previously mentioned, FIG. 8 shows a flowchart of the sudden appearance determination process of step S4 in FIG. 7. In the flowchart, the coincidence rate calculation unit 17 calculates the coincidence rate in step S21. Then, it is determined in step S22 whether or not the coincidence rate is greater than a threshold T, an object detected using millimeter-wave radar can be determined to be the same as an object detected using infrastructure communication if the coincidence rate is greater than the threshold T, while if the coincidence rate is smaller than the threshold T, it is determined that there is no object detected using millimeter-wave radar corresponding to an object detected using infrastructure communication. That is, an object among objects detected using infrastructure communication that is not detected using millimeter-wave radar can be singled out.

In step S23, the behavior prediction unit 13 predicts the path of another vehicle or a pedestrian from the positional information acquired from the communication unit position detection unit 12, and represents the prediction as a velocity vector. This velocity vector is taken to be a predicted path vector.

When there are a multiple of objects detected using infrastructure communication, the one with the highest coincidence rate is determined to be the same as an object detected using millimeter-wave radar, that is, the same as a moving body. Also, when there is an object detected using infrastructure communication in a position extremely near a moving body with a high coincidence rate, determination of whether or not the object is a target of the sudden appearance determination process is carried out depending on whether or not the object is within the millimeter-wave radar detection region.

Meanwhile, if the coincidence rate is equal to or lower than the threshold T in step S22, it is determined that an object detected is not the same as an object detected using infrastructure communication.

Also, when there is no moving body radar detected positional information corresponding to communication unit positional information obtained using infrastructure communication, a communication unit detected by the communication unit position detection unit 12 of the infrastructure communication unit 10 is assumed to be positioned outside the radar detection region, and on the premise that the communication unit is a moving body that may suddenly appear, the process of the behavior prediction unit 13 is carried out in accordance with a prediction vector of a moving body acquired using infrastructure communication, as illustrated in FIG. 6.

If it is determined in step S22 that the coincidence rate is equal to or lower than the threshold T, the sudden appearance determination process is continued in accordance with the determination, and collision is avoided. Because of this, the millimeter-wave radar system including the radar detection unit 11 is such that there is no need for a collision avoiding process to be newly carried out with respect to an object once recognized using infrastructure communication, even when a moving body appears in the radar detection region from a blind spot. By integrating information acquired using infrastructure communication and radar detected positional information obtained using millimeter-wave radar in this way, the amount of information processing can be reduced.

In step S24, the behavior prediction unit 13 predicts the behavior of the vehicle itself, in the same way as predicting the path of another vehicle or a pedestrian, from the track to date of the vehicle itself acquired from the CAN or the like, and represents the prediction as a velocity vector. This velocity vector is taken to be a predicted path vector.

In step S25, the behavior prediction unit 13 compares the predicted path vector of another vehicle or a pedestrian calculated in step S23 and the predicted path vector of the vehicle itself calculated in step S24, and determines that a sudden appearance of a moving body with respect to the vehicle itself will occur when the end point of the predicted path vector of the other vehicle or pedestrian is within the certain radius D from the end point of the predicted path vector of the vehicle itself, or when the two predicted path vectors intersect.

Figure 9A:
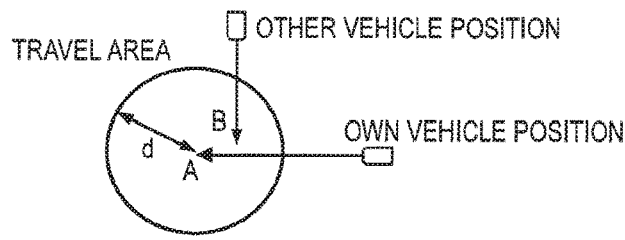
FIGS. 9A and 9B are schematic views indicating a case in which sudden appearance is determined.
Figure 9B:
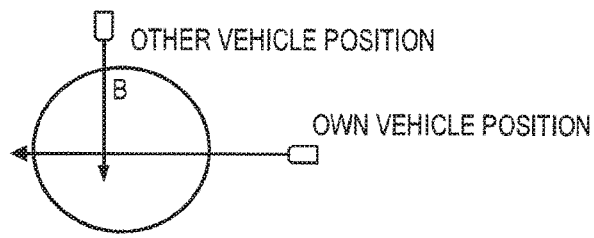

FIGS. 9A and 9B show examples of determining sudden appearance when the endpoints are near and when the prediction vectors intersect.

Also, when the behavior prediction unit 13 determines in step S25 that sudden appearance will occur, the process divides at step S26, and the sudden appearance probability calculation unit 18 calculates the sudden appearance probability in step S27. The sudden appearance probability is calculated in accordance with the distance between the end points of the prediction vector of the vehicle itself and the prediction vector of the other vehicle or pedestrian, and on whether or not the vectors intersect.

The sudden appearance probability is defined below. When a distance AB between an end point A of the prediction vector of the vehicle itself and an end point B of the prediction vector of the other vehicle or pedestrian is taken to be x and the radius of a hazardous area shown in FIG. 9A is taken to be d when the end points are near, as shown in FIG. 9A, a sudden appearance probability Rc is $$Rc = 50 + 50 \times (d-x)D$$

(no intersection of prediction vectors, and $0 < x < d$)
D: infrastructure communication prediction radius.

Consequently, when the prediction vector of the vehicle itself and the prediction vector of the other vehicle intersect, as shown in FIG. 9B, the sudden appearance probability Rc is $$Rc = 100$$

(with intersection of prediction vectors).

The hazardous area radius d is set at an optional value as a parameter. When the value is large, it is easy to determine that there will be a sudden appearance, but the reliability decreases.

Also, the road information acquisition unit 14 may acquire the hazardous area radius d as road information from infrastructure.

Also, when the behavior prediction unit 13 does not determine in step S25 that there will be a sudden appearance, the process divides at step S26, and the sudden appearance probability calculation unit 18 ends by setting the sudden appearance probability at 0 in step S28.

Threshold Change Process procedure

FIG. 10 shows a flowchart of a threshold change process. Continuing from step S4 in FIG. 7, a threshold change process of step S41 onward is carried out. In step S41, the coincidence rate calculation unit 17 calculates the coincidence rates of an object detected using radar and all objects detected using infrastructure communication, and searches for the object with the highest coincidence rate.

In the following step S42, the coincidence rate calculation unit 17 confirms the moving body category of the object with the highest coincidence rate detected using infrastructure communication. Then, if the category is a human in step S43, the moving body identification unit 16 raises the amplitude threshold in accordance with the degree of coincidence in step S44, whereby the object is easily identified as a human. 6

Meanwhile, if the category is a vehicle in step S43, the moving body identification unit 16 lowers the amplitude threshold in accordance with the degree of coincidence instep S45, whereby the object is easily identified as a vehicle.

Sudden Appearance Determination Correction Process Procedure (Traffic Light Information)

The road information acquisition unit 14 is configured so as to acquire information relating to the road environment in the periphery of the vehicle itself. That is, the road information acquisition unit 14 acquires information on the lighting state of traffic lights and the existence of road signs. Further, for example, when the lighting state of a set of traffic lights in the vicinity of another vehicle or a pedestrian is red when determining sudden appearance in step S25 in FIG. 8, it is determined that there is a high possibility of the other vehicle or pedestrian stopping because of the traffic lights, and the sudden appearance probability is estimated to be low.

As one example, the sudden appearance probability Rc is corrected as below. Cr, Cy, and Cb indicate correction values when the lighting state of a set of traffic lights in the vicinity of another vehicle or a pedestrian is red, yellow, and green respectively. A sudden appearance probability Rc1 after correction shown below is calculated.

$Rc1 = Rc - Cr$ (when red)

$Rc1 = Rc - Cy$ (when yellow)

$Rc1 = Rc - Cb$ (when green)

The correction values Cr, Cy, and Cb can be set at optional values as parameters. By Cr when the lights are red being greater than Cy when the lights are yellow, the sudden appearance probability when a set of traffic lights in the vicinity of another vehicle or a pedestrian is red is smaller than when the lights are yellow, and by Cb when the lights are green being set close to 0, the degree of accuracy of the sudden appearance determination can be raised.

Also, the road information acquisition unit 14 may acquire setting values of the correction values Cr, Cy, and Cb using infrastructure communication.

Sudden Appearance Determination Correction Process Procedure (Crossing Prohibited, Halt, Priority Road)

Road sign information to the effect that crossing of the road of the vehicle itself is prohibited, or that the road has a halt or is a priority road, or the like, is acquired by the road information acquisition unit 14. When carrying out the sudden appearance determination of step S25 in FIG. 8, the coincidence rate calculation unit 17 determines that no pedestrian will cross, and estimates the sudden appearance probability to be low.

As one example, the sudden appearance probability Rc is corrected as below. Cs indicates a correction value in accordance with a road sign such as crossing prohibited, halt, or priority road, and the sudden appearance probability Rc1 after correction is calculated using the following equation.

$Rc1 = Rc - Cs$ (in the case of crossing prohibited, halt, or priority road).

The correction value Cs is set at an optional value as a parameter. Also, a setting value may be acquired by the road information acquisition unit 14 using infrastructure communication.

Also, information on a halt or priority road is not necessarily only road sign information, but also includes information painted on the road.

Sudden Appearance Determination Correction Process Procedure (Accident Occurrence Information)

Information on past sudden appearance accident occurrence and hazardous places is acquired by the road information acquisition unit 14. When carrying out the sudden appearance determination of step S25 in FIG. 8, the coincidence rate calculation unit 17 determines that a place is hazardous, and sets the sudden appearance probability to be high.

As one example, the sudden appearance probability Rc is corrected as below. Ca indicates an accident occurrence correction value when an accident has occurred in the past, and the sudden appearance probability Rc1 after correction is calculated using the following equation.

$Rc1 = Rc - Ca$ (when an accident has occurred).

Bicycle Distinguishing Process Procedure

When amplitude is within a certain range $\alpha$, which is a threshold, and the moving body identification unit 16 has difficulty in distinguishing between a vehicle and a pedestrian when comparing amplitude and threshold in step S9 in FIG. 7, the moving body identification unit 16 determines in step S10 that the moving body category is a bicycle.

The value $\alpha$ used in bicycle distinguishing is acquired by the moving body identification unit 16 using infrastructure communication.

When the answer is "No" in step S9 in FIG. 7, and the system does not end in step S11, the radar detection of step S1 is carried out again. Meanwhile, when the system ends in step S11, the radar moving body distinguishing process of FIG. 7 ends.

According to the moving body recognition system of the first embodiment, as heretofore described, millimeter-wave radar moving body distinguishing wherein a vehicle and pedestrian are distinguished between in accordance with the signal strength of reflected waves is such that, using a result of infrastructure information detection, a distinguishing threshold is raised or lowered in accordance with the coincidence rate with an object detected using infrastructure information, whereby the degree of detection accuracy can be increased.

Also, according to the first embodiment, the behavior of another vehicle or a pedestrian outside a millimeter-wave radar detection region is expressed as a prediction vector, and a sudden appearance after millimeter-wave radar detection can be detected by calculating the distance of the prediction vector from a prediction vector of the vehicle itself and whether or not the vectors intersect.

Also, according to the first embodiment, traffic light information is acquired from infrastructure, and when there is a factor causing the movement of a moving body to stop, such as a road in the vicinity of another vehicle or a pedestrian having a red light, the probability of the other vehicle or the pedestrian suddenly appearing is estimated to be low, whereby the degree of accuracy of sudden appearance prediction can be raised.

Also, traffic lights not being the only factor causing the movement of a moving body to stop, when crossing is prohibited at the location of a pedestrian, or when there is a halt point on a road in the vicinity of another vehicle, the probability of the other vehicle or the pedestrian suddenly appearing is estimated to be low, whereby the degree of accuracy of sudden appearance prediction can be raised.

Also, priority road information is acquired from infrastructure such as a roadside unit installed at an intersection, and the probability of another vehicle or a pedestrian suddenly appearing is estimated to be low when the vehicle itself is on a priority road, whereby the degree of accuracy of sudden appearance prediction can be raised.

Also, according to the first embodiment, information on accident occurrence is acquired from infrastructure such as a roadside unit installed at an intersection, and when the place is a road where an accident has occurred in the past or where there is a danger of sudden appearance, the probability of another vehicle or a pedestrian suddenly appearing is estimated to be high, whereby the degree of accuracy of sudden appearance prediction can be raised.

Also, according to the first embodiment, when it is difficult to distinguish between a pedestrian and a vehicle simply from the signal strength of reflected millimeter-wave radar waves, and when acquiring information from infrastructure distinguishing a moving body as a pedestrian, the moving body is distinguished as a bicycle, whereby the degree of accuracy of moving body distinguishing can be raised.

According to the first embodiment, a moving body positioned in a blind spot of a millimeter-wave radar detection region is recognized using communication unit positional information, and moving bodies positioned in the millimeter-wave radar detection region are such that moving bodies taken as a target are limited by information near positional information obtained by a moving body position detection unit using millimeter-wave radar being deleted. This reduction of moving body information, a prediction of moving body behavior, calculation of moving body sudden appearance probability, and the like, are carried out by the moving body recognition unit 100.

Second Embodiment

In the first embodiment, the moving body recognition system is described as being for mounting in a vehicle. The moving body recognition system, not being limited to mounting in a vehicle, can be provided in a system that provides road information, detect positional information of a vehicle-mounted communication unit using infrastructure communication, and be utilized so as to provide information to a moving body with which an encounter is envisaged. In particular, an information provision system of a roadside unit is such that a sudden collision can be prevented by lighting of traffic lights for traffic control being manipulated in accordance with traffic conditions. A configuration and functions of the system are the same as in the first embodiment, in which the system is described as a vehicle-mounted system.

Various modifications and alterations of the invention will be apparent to those skilled in the art without departing from the scope and spirit of this invention, and it should be understood that this is not limited to the illustrative embodiments set forth herein.

What is claimed is:

1. A moving body recognition system, comprising:
   a millimeter-wave radar that receives millimeter-wave radar waves reflected from a moving body and detects radar-based positional information of the moving body in a radar detection region;
   a position detector that detects positional information of a plurality of moving bodies, by using a signal from a plurality of portable terminals that are carried by the plurality of moving bodies, respectively; and
   at least one microprocessor comprising a moving body recognizer to recognize that a monitored moving body of the plurality of moving bodies is positioned in a blind spot of the radar detection region by deleting information of the monitored moving body from the positional information of the moving body in response to the monitored moving body detected by the position detector not corresponding to the moving body detected by the millimeter-wave radar.

2. The moving body recognition system according to claim 1, wherein the millimeter-wave radar, the position detector, and the moving body recognizer are mounted in a vehicle.

3. The moving body recognition system according to claim 1, wherein the millimeter-wave radar, the position detector, and the moving body recognizer are provided in a system that provides road information.

4. The moving body recognition system according to claim 1, wherein the millimeter-wave radar comprises:
   a coincidence rate calculation unit, which calculates a coincidence rate of the radar-based positional information and the position detector positional information; and
   a moving body identification unit that identifies a category of the moving body detected by the millimeter-wave radar, and changes a threshold when calculating the coincidence rate in accordance with a result of identification by the moving body identification unit.

5. The moving body recognition system according to claim 4, wherein in response to a difference between an amplitude of the millimeter-wave radar waves and a threshold value being less than a predetermined range, the moving body is determined to be a bicycle.

6. The moving body recognition system according to claim 1, wherein the moving body recognizer includes a behavior prediction unit that, based on tracking information of the plurality of portable terminals existing outside the radar detection region of the millimeter-wave radar, predicts behavior of the moving body using a positional information prediction vector of the plurality of portable terminals.

7. The moving body recognition system according to claim 6, wherein the moving body recognizer has a sudden appearance probability calculation unit that calculates a probability of the moving body suddenly appearing in accordance with the behavior prediction unit, and when there is a factor causing the moving body to stop in accordance with acquired road information, the sudden appearance probability calculated by the sudden appearance probability calculation unit is estimated to be low.

8. The moving body recognition system according to claim 7, wherein the factor causing the moving body to stop is a road sign indicating that crossing is prohibited.

9. The moving body recognition system according to claim 7, wherein the factor causing the moving body to stop is a road sign indicating a halt.

10. The moving body recognition system according to claim 7, wherein the factor causing the moving body to stop is that a vehicle itself is on a priority road.

11. The moving body recognition system according to claim 6, wherein the moving body recognizer has a sudden appearance probability calculation unit that calculates a probability of the moving body suddenly appearing in accordance with the behavior prediction unit, and when acquired road information indicates a place where an accident due to sudden appearance has occurred or a dangerous place, the sudden appearance probability calculated by the sudden appearance probability calculation unit is estimated to be high.

* * * * *